(12) United States Patent
Platt et al.

(10) Patent No.: US 8,606,541 B2
(45) Date of Patent: Dec. 10, 2013

(54) COMBINED AMPLITUDE AND FREQUENCY MEASUREMENTS FOR NON-CONTACTING TURBOMACHINERY BLADE VIBRATION

(75) Inventors: Michael J. Platt, Easton, NH (US); John J. Jagodnik, Mine Hill, NJ (US)

(73) Assignee: Mechanical Solutions, Inc., Whippany, NJ (US)

( * ) Notice: Subject to any disclaimer, the term of this patent is extended or adjusted under 35 U.S.C. 154(b) by 570 days.

(21) Appl. No.: 12/795,124

(22) Filed: Jun. 7, 2010

(65) Prior Publication Data

US 2011/0098948 A1   Apr. 28, 2011

Related U.S. Application Data

(60) Provisional application No. 61/186,510, filed on Jun. 12, 2009.

(51) Int. Cl.
*G01B 7/02*   (2006.01)
*G01H 1/00*   (2006.01)

(52) U.S. Cl.
CPC ..................................... *G01H 1/006* (2013.01)
USPC ................................ 702/170; 702/56; 73/661

(58) Field of Classification Search
CPC ...................................................... G01H 1/006
USPC .............................................. 702/56; 73/661
See application file for complete search history.

(56) References Cited

U.S. PATENT DOCUMENTS

| | | |
|---|---|---|
| 4,607,529 A | 8/1986 | Morey |
| 4,887,468 A * | 12/1989 | McKendree et al. ........... 73/660 |
| 4,955,269 A | 9/1990 | Kendig et al. |
| 5,479,826 A * | 1/1996 | Twerdochlib et al. .......... 73/660 |
| 5,511,426 A | 4/1996 | Clement et al. |
| 5,686,669 A * | 11/1997 | Hernandez et al. ............. 73/660 |
| 6,094,989 A * | 8/2000 | Twerdochlib ................... 73/659 |
| 6,195,982 B1 * | 3/2001 | Gysling et al. .................. 60/204 |

(Continued)

FOREIGN PATENT DOCUMENTS

WO   2008/074300   6/2008

OTHER PUBLICATIONS

Zimmer, A., Investigation of the Impact of Turbine Blade Geometry on Near-Field Microwave Blade Tip Time of Arrival Measurements, Dec. 2008, Georgia Institute of Technology.*

(Continued)

*Primary Examiner* — Sujoy Kundu
*Assistant Examiner* — Timothy H Hwang
(74) *Attorney, Agent, or Firm* — Merek, Blackmon & Voorhees, LLC

(57) ABSTRACT

A method and apparatus for measuring the vibration of rotating blades, such as turbines, compressors, fans, or pumps, including sensing the return signal from projected energy and/or field changes from a plurality of sensors mounted on the machine housing. One or more of the sensors has a narrow field of measurement and the data is processed to provide the referenced time of arrival of each blade, and therefore the blade tip deflection due to vibration. One or more of the sensors has a wide field of measurement, providing a time history of the approaching and receding blades, and the data is processed to provide frequency content and relative magnitudes of the active mode(s) of blade vibration. By combining the overall tip deflection magnitude with the relative magnitudes of the active modes, the total vibratory stress state of the blade can be determined.

21 Claims, 3 Drawing Sheets

(56) References Cited

U.S. PATENT DOCUMENTS

| | | | |
|---|---|---|---|
| 6,489,917 B2 * | 12/2002 | Geisheimer et al. | 342/127 |
| 6,584,849 B2 * | 7/2003 | Loftus et al. | 73/659 |
| 7,373,823 B2 * | 5/2008 | Bosselmann et al. | 73/620 |
| 2004/0243310 A1 * | 12/2004 | Griffin et al. | 702/10 |
| 2007/0132461 A1 * | 6/2007 | Holmquist et al. | 324/644 |
| 2009/0301055 A1 * | 12/2009 | Kallappa | 60/39.091 |
| 2010/0089166 A1 | 4/2010 | Zielinski et al. | |

OTHER PUBLICATIONS

Witek et al., Fracture Analysis of Compressor Blade of a Helicopter Engine, Engineering Failure Analysis 16 (2009) 1616-1622, Available online Nov. 13, 2008.*

Mazur et al., Investigation of the Failure of the L-0 Blades, Engineering Failure Analysis 13 (2006) 1338-1350.*

Kemp et al., Analytical Investigation of Distribution of Centrifugal Stresses and Their Relation to Limiting Operating Temperatures in Gas-Turbine Blades, Reserach Memorandum for the National Advisory Committee for Aeronautics, Apr. 12, 1948, Declassified Jun. 16, 1983.*

Zielinski et al., Noncontact Vibration Measurements on Compressor Rotor Blades, Meas. Sci. Technol. 11 (2000) 847-856.*

European Search Report issued Oct. 13, 2010, by the European Patent Office for corresponding European Patent Application No. 10006031.8.

* cited by examiner

COMBINED AMPLITUDE AND FREQUENCY MEASUREMENTS FOR NON-CONTACTING TURBOMACHINERY BLADE VIBRATION

CROSS-REFERENCE TO RELATED APPLICATIONS

This application claims the benefit of U.S. Patent Application 61/186,510, filed Jun. 12, 2009, the contents of which are incorporated herein by reference.

STATEMENT REGARDING FEDERALLY SPONSORED RESEARCH OR DEVELOPMENT

This invention was made under Contract No. N68335-08-C-0215 with the U.S. Naval Air Warfare Center AD (LKE). Further development was also pursued under NASA Contract No. NNX08CC54P and NNX09CA34C. The Government has certain rights in this invention.

FIELD OF THE INVENTION

The present invention relates a blade health monitoring system generally, and more particularly to a sensing system and a method for processing data from operating turbomachinery to provide an accurate determination of turbomachinery blade stress.

BACKGROUND

Expanded design and operational requirements for turbomachinery can push the system, subsystem, and component designs against the limits of their fatigue boundaries. This in turn raises the design complexity needed for expanded performance as well as the vibration sensitivity of the blade rows due to the expanded mission roles. The design trends for fans and compressors are seen in higher relative Mach number and tip speed, lower stage count, higher stage loading, and a lower radius ratio. This leads to thin, twisted, low aspect ratio blades with high steady stress levels, low foreign object damage margin, and stronger aerodynamic forcing functions. The end result is an integrally bladed rotor with low damping and low margin. The same trends are seen in turbines, with the added complexities of higher inlet temperatures, warmer cooling air, and more complex cooling schemes. With reduced margins, more detailed characterization of current and potential turbomachinery systems is required.

The disclosed embodiment of the present invention is an innovative blade health monitoring system capable of dramatically improved classification of blade vibration response in terms of mistuning and closely spaced modes. This is needed because of limitations in the prior art for measuring blade response during operation. Strain gage surveys can provide useful data to engineering teams, but are generally limited by several factors. First, the time and cost of strain gage testing is prohibitive for most circumstances. Strain gages have limited fatigue and durability, generally reducing the scope of planned vibration surveys. A limit to the number of available telemetry (or slip ring) channels also means that a small number of blades can be monitored at a given time.

For these reasons, much of the prior art involves some form of Non-contacting Stress Measurement System (NSMS), also known as tip-timing. However, there are several technical challenges in NSMS that have limited the applicability of this technology for general purpose blade health monitoring. Two of the most pressing are the undersampling that is inherent in time-of-arrival data processing and the uncertainty that is introduced by inferring, as opposed to calculating, the mode of vibration. Incorrect mode inferences are known to lead to order of magnitude errors in blade stress estimates.

Significant advancements have been made in NSMS capability by utilizing multiple blade tip sensors at predefined circumferential and axial locations. While this has somewhat reduced the uncertainty with identification of the vibration mode, the spatial resolution of such a system is limited to the deflection at the blade tip. Using a large number of blade tip sensors has also reduced the undersampling error, but this works against the real-world limits on the size, weight, and reliability of the measurement system as a whole. The use of multiple blade tip sensors is also strongly dependent on a-priori knowledge of the vibration modes that are present in order to determine the required number of sensors and their optimal locations. This dependency limits the adaptability of the system for general blade vibration surveys and HCF troubleshooting.

SUMMARY

One embodiment of the present invention provides a sensing system and a method for processing data from operating turbomachinery. The sensing system preferably comprises a plurality of sensors that are configured to direct energy towards or measure the field changes from the rotating blades, along with the associated receivers to detect the signal as modulated by the blade motion. Various embodiments of the plurality of sensors include, but are not limited to: (a) light sensors including, but not limited to white light and laser sensor, for example, that direct focused light beams and/or lines towards the blade and measure the reflected component, (b) radio frequency sensors that direct radar waves towards the blades and measure the frequency and phase modulation due to blade motion, and (c) eddy current, inductive, and capacitive sensors that react to objects moving through their generated field, responding to the moving object.

DETAILED DESCRIPTION OF THE PREFERRED EMBODIMENTS

Figure 1:
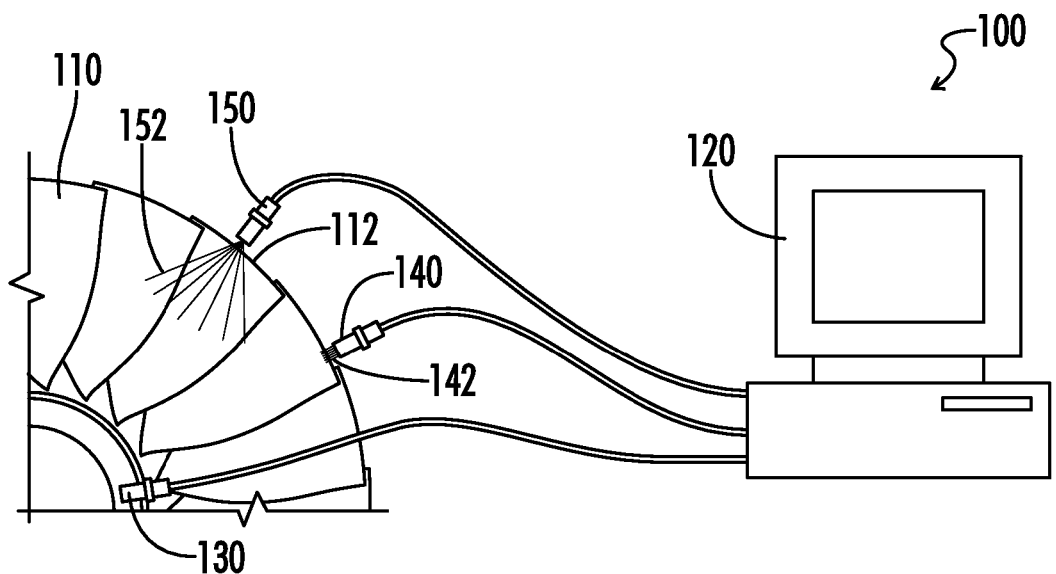
FIG. 1 is one embodiment of an apparatus of the present invention that uses a combination of sensors with wide and narrow field of view to provide blade tip deflection and vibration frequency measurements.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

FIG. 1 illustrates one embodiment of a sensing system 100 for use on a turbomachinery blade 110 or other rotating blades, such as turbines, compressors, fans, or pumps, and comprising a processor 120, a reference probe 130, and one or more first sensors 140 configured with a narrow field of measurement to record high precision referenced arrival times for each individual blade tip 112 at the sensor location 142. Changes in the referenced time of arrival are related by data processing methods to provide a total blade tip deflection due to vibration. Since the accuracy of the time of arrival is defined by the rise time of the blade pass pulse, the effective measurement width of the narrow field sensor 140 is generally and preferably equal to or less than the blade tip thickness. In addition, one or more second sensors 150 is configured with a wide field of measurement 152, sensing the blade 110 at a distance as it rotates past the sensor 150 to provide a time history of the blade position. To produce a time history of the blade vibration, the effective measurement width of the wide field sensor is preferably on the order of the inter-blade spacing. Time and frequency domain data processing methods effectively separate the contributions from the rigid body rotation and blade vibration, providing a spectrum of blade vibration magnitude. System data processing methods use the overall tip deflection magnitude along with the blade vibration spectrum to calculate the modal contribution for each mode of vibration that is present.

While FIG. 1 illustrates one sensor 140 having a narrow field of measurement and one sensor 150 having a wide field of measurement, it will be appreciated that other combinations are possible. For example, one embodiment (not shown) may include one sensor having a narrow field of measurement combined with a plurality of sensors having a wide field of measurement. Similarly, one embodiment (not shown) may include one sensor having a wide field of measurement combined with a plurality of sensors having a narrow field of measurement.

A variety of different types of sensors may be used. In one embodiment, at least one of the first or second sensors is a light sensor that directs focused light beams and/or lines towards the turbomachinery blade and measures the reflected component. Such light sensor may be, for example, a white light sensor or a laser. Other types of light-based sensors are possible. In another embodiment, at least one of the first or second sensors is a radio frequency sensor that directs radar waves towards the turbomachinery blade and measures the frequency and phase modulation due to blade motion. In another embodiment, at least one of the first or second sensors is an eddy current, inductive, or capacitive sensor that reacts to objects moving through their generated field, responding to the moving object. Alternatively, a combination of different types of sensors may be used for each of the first and second sensors.

Figure 2:
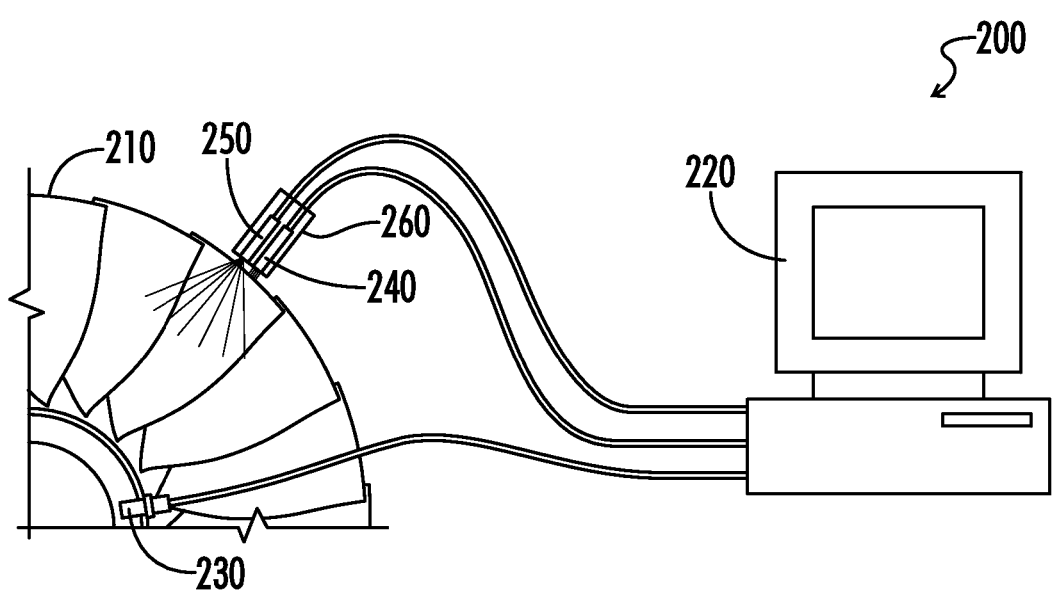
FIG. 2 is an alternative embodiment of an apparatus to provide blade tip deflection and vibration frequency measurements.

FIG. 2 illustrates yet another embodiment of a sensing system 200 for use on a turbomachinery blade 210 or the like and comprising a processor 220, a reference probe 230, one or more first sensors 240 configured with a narrow field of measurement, and one or more second sensors 250 configured with a wide field of measurement, wherein the first and second sensors 240 and 250 are housed within a common sensor casing 260. While not illustrated or specifically described herein, other combinations are contemplated.

In the embodiments of FIGS. 1 and 2, the reference probe and sensors are directly connected to the processor. However, it will be appreciated that an indirect connection is also possible. For example, the processor may be situated in a different location relative to the blade being tested, and the sensors may be connected to the processor through a LAN or WAN (such as the Internet), whereby the sensors are equipped with transmitters that wirelessly communicate signals to a receiver associated with the processor. In another example (not shown), the sensors may be connected to a portable digital device such as a handheld device that communicates the sensor data to a central processor at some predetermined location onsite or in a remote location, which can be beneficial if the blade cannot be transported to the facility in which the central processor is housed, or if the blade is housed in a dangerous location and movement of the blade would be difficult or undesirable. Other arrangements are possible.

Embodiments of the method and apparatus described overcome various turbomachinery measurement challenges relative to the prior art. One area of prior art to those in the field, namely the traditional tip-timing method, has been validated in terms of blade deflection but can be problematic when it comes to mode identification and therefore suffer from an unacceptable total measurement uncertainty. The second area of prior art, sensing systems with a wider field of view, have been effective in providing frequency content but are error prone when applied to turbomachinery due to the interaction between the complex speed-dependent blade shape and the changes in the projected energy and/or sensor field. The method and apparatus of the embodiments described herein use a combination of blade tip deflection measurements along with wide view frequency measurement to provide a more accurate determination of turbomachinery blade stress.

Figure 3:
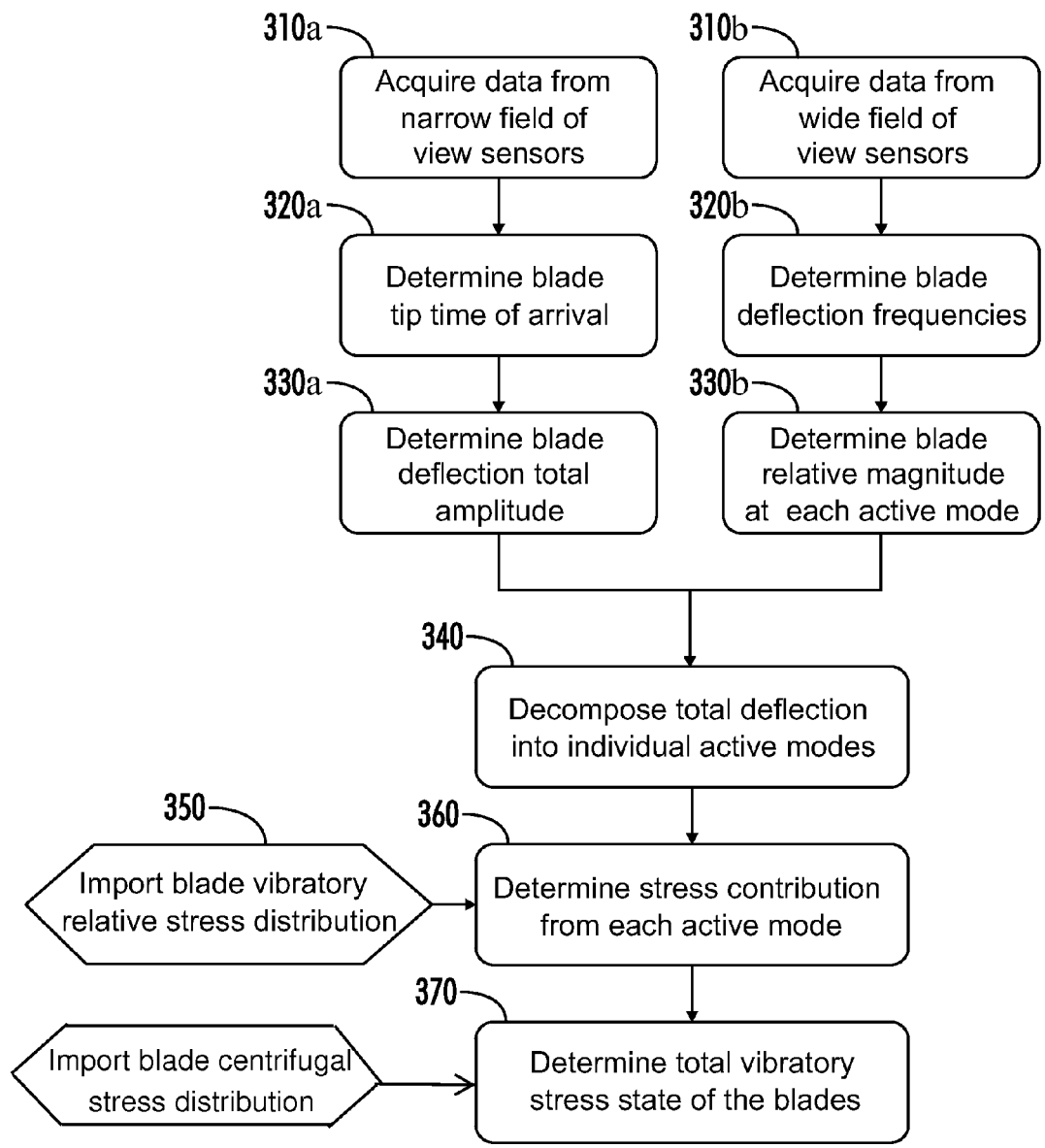
FIG. 3 is a method of combining blade tip deflection and vibration frequency measurements in accordance with one embodiment of the present invention.

FIG. 3 illustrates one embodiment of a method for determining the total stress state of a rotating turbomachinery blade, for example, the method generally comprising associating at least one first sensor with a turbomachinery blade, the at least one first sensor having a narrow field of measurement, determining blade tip time of arrival data from the at least one first sensor, associating at least one second sensor with a turbomachinery blade, the at least one second sensor having a wide field of view, and determining amplitude, frequency and phase data from the at least one second sensor. More specifically, data from the one or more narrow field sensors is acquired (310a) and processed to determine the referenced time of arrival of each blade (320a), and therefore its blade tip deflection due to vibration (330a). This process is similar to the single degree of freedom (SDOF) and multiple degree of freedom (MDOF) methods known to one skilled in the art. The resulting deflection value is the total deflection at the tip, and includes the sum of all synchronous and asynchronous modes that are present. At the same time, the data from the one or more wide field sensors is acquired (310b) and processed to determine the Fourier spectrum of blade vibration. This spectrum contains the individual blade frequencies (320b) that are actively vibrating as well as the relative magnitudes (330b) of each of those active modes of vibration.

Using the total blade tip amplitude (330a) from the one or more narrow field sensors along with the relative magnitude of each active mode (330b) from the one or more wide field sensors, the method further comprises the decomposing (340) of the total deflection into the separate contributions from each of the individual modes of vibration that are actively present. The known blade vibratory relative stress distributions for the active modes (350) are then used to determine the absolute stress distributions for each active mode (360). Finally, by combining the individual spectral components, the total vibratory stress state of the blade is determined (370).

Figure 4:
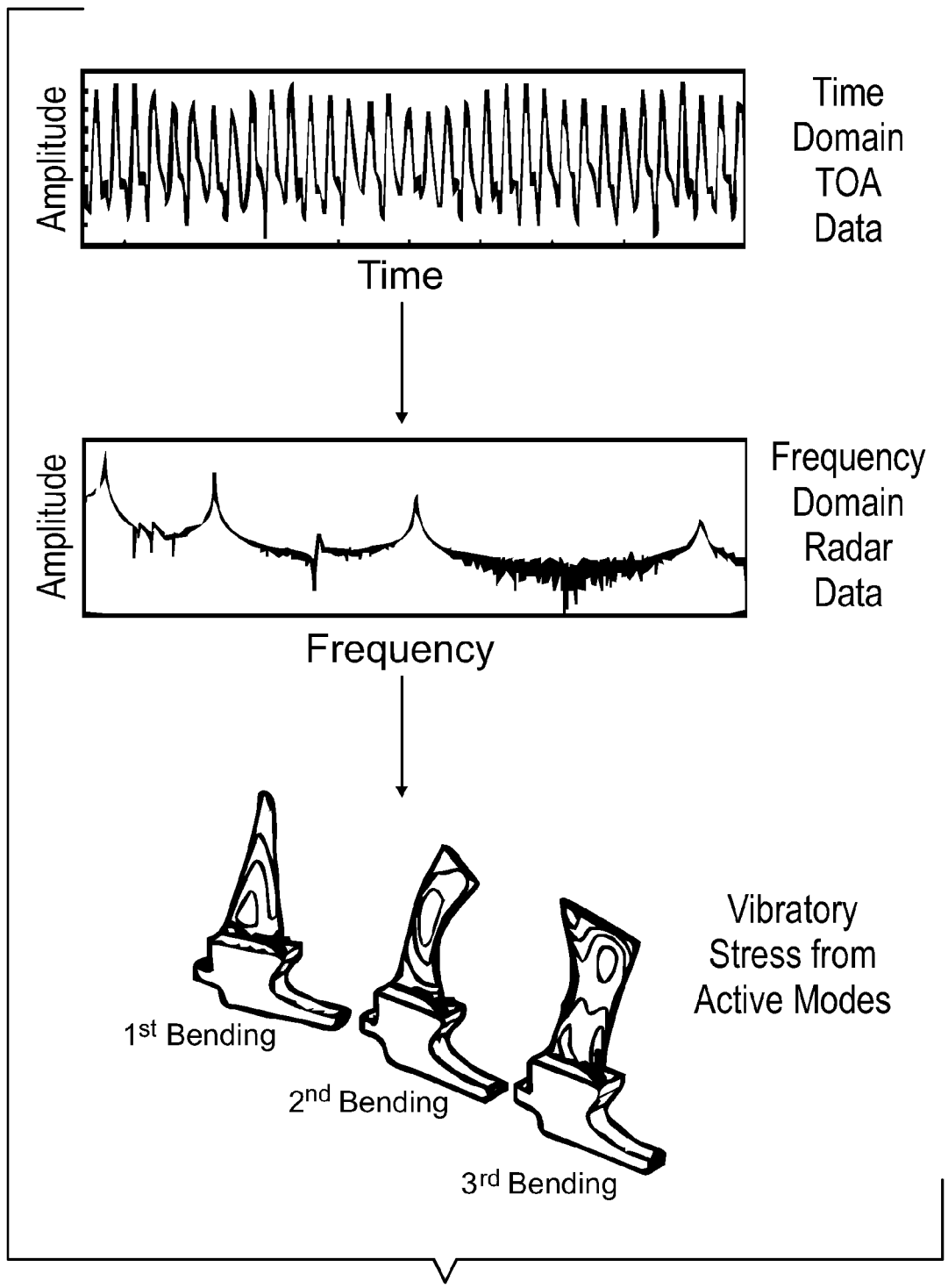
FIG. 4 is sample data that illustrates a method of combining blade tip deflection and vibration frequency measurements in accordance with one embodiment of the present invention.

FIG. 4 illustrates one example of data that is used in one embodiment of a method for determining the total stress state of a rotating turbomachinery blade. The time of arrival data from at least one sensor having a narrow field of measurement is processed in the time domain to determine the blade tip deflection from the deviation between the expected versus actual time of arrival. The data from at least one sensor with a wide field of measurement is processed in the frequency domain to provide a vibration spectrum for the blades, which indicates the individual blade frequencies that are active at any given time as well as their relative magnitudes. The individual stress contributions from the active vibration modes are then determined as described, for example, in the method set forth in FIG. 3.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method of measuring the vibration of a blade comprising:
    a) associating at least one first sensor with a blade, the at least one first sensor having a narrow field of measurement;
    b) determining blade tip time of arrival data from the at least one first sensor to determine a total blade tip deflection;
    c) associating at least one second sensor with the blade, the at least one second sensor having a wide field of view;
    d) determining amplitude, frequency and phase data of the blade from the at least one second sensor;
    e) determining, by the processor, the vibration of the blade using the blade tip time of arrival data and the amplitude, frequency and phase data; and
    f) decomposing, by the processor, the total blade tip deflection into a deflection contribution due to each of the individual active mode of vibration of the blade.

2. The method of claim 1, further comprising using the amplitude and phase data to determine the relative magnitudes of the active modes of vibration of the blade prior to the step of decomposing the total blade tip deflection into a deflection contribution due to each of the individual active modes of vibration of the blade.

3. The method of claim 1, further comprising the step of using known blade vibratory relative stress distribution of the blade to determine a stress contribution due to each of the individual active modes of vibration of the blade.

4. The method of claim 3, further comprising using spectral component combination to determine a total vibratory stress state of the blade.

5. The method of claim 3, further comprising using known or separately determined centrifugal stress distribution of the blade to determine a combined stress state of the blades.

6. The method of claim 1, wherein at least one of the first or second sensors is a light sensor that directs light beams and/or lines towards the blade and measures a reflected component, wherein the light sensor further comprises one of a while light or laser.

7. The method of claim 1, wherein the at least one first sensor and the at least one second sensor is housed within a common casing.

8. The method of claim 1, wherein at least one of the first or second sensors is a radio frequency sensors that direct radar waves towards the blade and measures the frequency and phase modulation due to blade motion.

9. The method of claim 1, wherein at least one of the first or second sensors is an eddy current, inductive, magnetic or capacitive sensor that reacts to the blade moving through a generated field, responding to the moving blade.

10. A method of measuring the vibration of a blade comprising:
    a) associating at least one first sensor with a blade, the at least one first sensor having a narrow field of measurement;
    b) determining blade tip time of arrival data from the at least one first sensor;
    c) associating at least one second sensor with the blade, the at least one second sensor having a wide field of view;
    d) determining amplitude, frequency and phase data of the blade from the at least one second sensor;
    e) determining, by the processor, the vibration of the blade using the blade tip time of arrival data and the amplitude, frequency and phase data;
    f) using the time of arrival data to determine a total blade tip deflection;
    g) using the amplitude and phase data to determine the relative magnitudes of the active modes of vibration of the blade; and
    h) decomposing, by the processor, the total blade tip deflection into a deflection contribution due to each of the individual active modes of vibration of the blade.

11. The method of claim 10, further comprising the step of using known blade vibratory relative stress distribution of the blade to determine a stress contribution due to each of the individual active modes of vibration of the blade.

12. The method of claim 11, further comprising using spectral component combination to determine a total vibratory stress state of the blade.

13. The method of claim 11, further comprising using known or separately determined centrifugal stress distribution of the blade to determine a combined stress state of the blades.

14. The method of claim 10, wherein at least one of the first or second sensors is a light sensor that directs light beams and/or lines towards the blade and measures a reflected component, wherein the light sensor further comprises one of a while light or laser.

15. The method of claim 10, wherein the at least one first sensor and the at least one second sensor is housed within a common casing.

16. The method of claim 10, wherein at least one of the first or second sensors is a radio frequency sensors that direct radar waves towards the blade and measures the frequency and phase modulation due to blade motion.

17. The method of claim 10, wherein at least one of the first or second sensors is an eddy current, inductive, magnetic or capacitive sensor that reacts to the blade moving through a generated field, responding to the moving blade.

18. The method of claim 10, wherein the blade has a blade tip thickness, and the at least one first sensor has an effective measurement width of substantially equal to or less than the blade tip thickness.

19. The method of claim 10, wherein the blade further comprises a plurality of blade segments having a spacing defined therebetween, and wherein the at least one second sensor has an effective measurement width on the order of the inter-blade spacing.

20. A method of measuring the vibration of a blade comprising:
   a) associating a first sensor with a blade, the first sensor having a narrow field of measurement;
   b) determining a total blade tip deflection from the first sensor;
   c) associating a second sensor with the blade, the second sensor having a wide field of view;
   d) determining at least one of the group of amplitude, frequency and phase data of the blade from the second sensor;
   e) calculating, by the processor, the total vibrations of the blade from the data from the first and second sensors; and
   f) decomposing, by the processor, the total blade tip deflection into a deflection contribution due to each of the individual active modes of vibration of the blade.

21. The method of claim 20, wherein said first sensor has a field of view less than 60 degrees, and wherein said second sensor has a wide field of view of more than 100 degrees.

* * * * *